United States Patent [19]
Ikeda et al.

[11] Patent Number: 5,966,260
[45] Date of Patent: Oct. 12, 1999

[54] MAGNETIC TAPE RECORDING AND REPRODUCING APPARATUS HAVING FOUR HEADS AND TWO AZIMUTH ANGLES

[75] Inventors: Katsumi Ikeda, Kanagawa; Takuji Himeno, Chiba; Takashi Katoku, Tokyo; Takanobu Sano, Kanagawa, all of Japan

[73] Assignee: Sony Corporation, Tokyo, Japan

[21] Appl. No.: 08/909,030

[22] Filed: Aug. 11, 1997

Related U.S. Application Data

[63] Continuation of application No. 08/492,698, Jun. 20, 1995, abandoned.

[30] Foreign Application Priority Data

Jun. 22, 1994 [JP] Japan ................................ P06-140589

[51] Int. Cl.$^6$ ............................... G11B 5/09; G11B 15/14
[52] U.S. Cl. ................................. 360/53; 360/64
[58] Field of Search ................................. 358/335, 310, 358/320; 360/8, 10.1, 11.1, 32, 48, 19.1, 64, 37.1, 51, 53; 386/74, 78, 72

[56] References Cited

U.S. PATENT DOCUMENTS

| | | | |
|---|---|---|---|
| 4,490,755 | 12/1984 | Tokuyama | 360/70 |
| 4,685,004 | 8/1987 | Takahashi et al. | 360/32 |
| 4,931,883 | 6/1990 | Baumeister et al. | 360/11.1 |
| 5,504,631 | 4/1996 | Kunito et al. | 360/8 |
| 5,519,547 | 5/1996 | Yamasaki et al. | 360/10.1 |

FOREIGN PATENT DOCUMENTS

| | | |
|---|---|---|
| 57-109071 | 7/1982 | Japan . |
| 03178003 | 8/1991 | Japan . |

*Primary Examiner*—W. Chris Kim
*Attorney, Agent, or Firm*—Jay H. Maioli

[57] ABSTRACT

A recording and reproducing apparatus for recording and reproducing a data signal on and from a magnetic tape includes a rotary head drum, first and second magnetic heads, third and fourth magnetic heads, a data processor, a data signal decoder, and controller. The magnetic tape is wrapped around the rotary head drum slanted at a predetermined angle. The first and second magnetic heads are provided on the rotary head drum at positions apart from each other by a predetermined rotational angle and have a first azimuth angle. The third and fourth magnetic heads are provided on the rotary head drum at positions apart from each other by a predetermined rotational angle and have a second azimuth angle different from the first azimuth angle. The data processor adds address data to each recording unit of a data signal and outputs the data signal as a recording signal. The data signal decoder decodes the data signal from recorded signals reproduced by the first, second, third, and fourth magnetic heads based on the address data included in the recorded signal. The controller, upon the recording, supplies the recording signal to the first magnetic head and the second magnetic head alternately at each rotation of the rotary head drum to record the same on the magnetic tape and, upon the reproduction, supplies the recorded signals reproduced by the first, second, third, and fourth magnetic heads to the data signal decoding means.

11 Claims, 11 Drawing Sheets

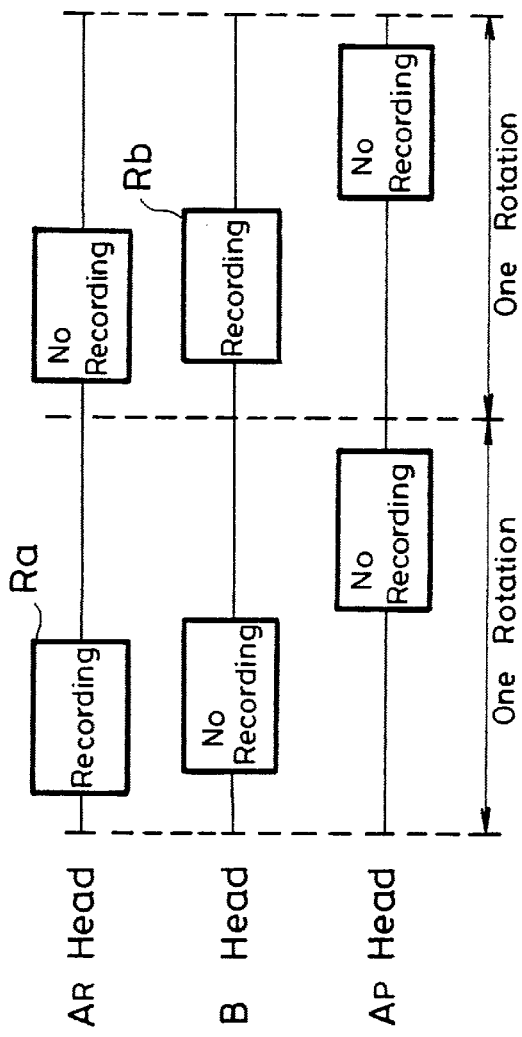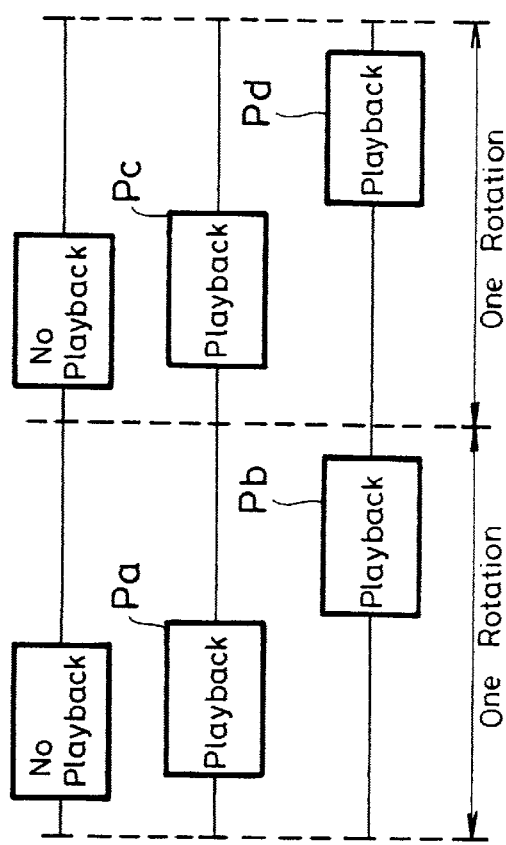

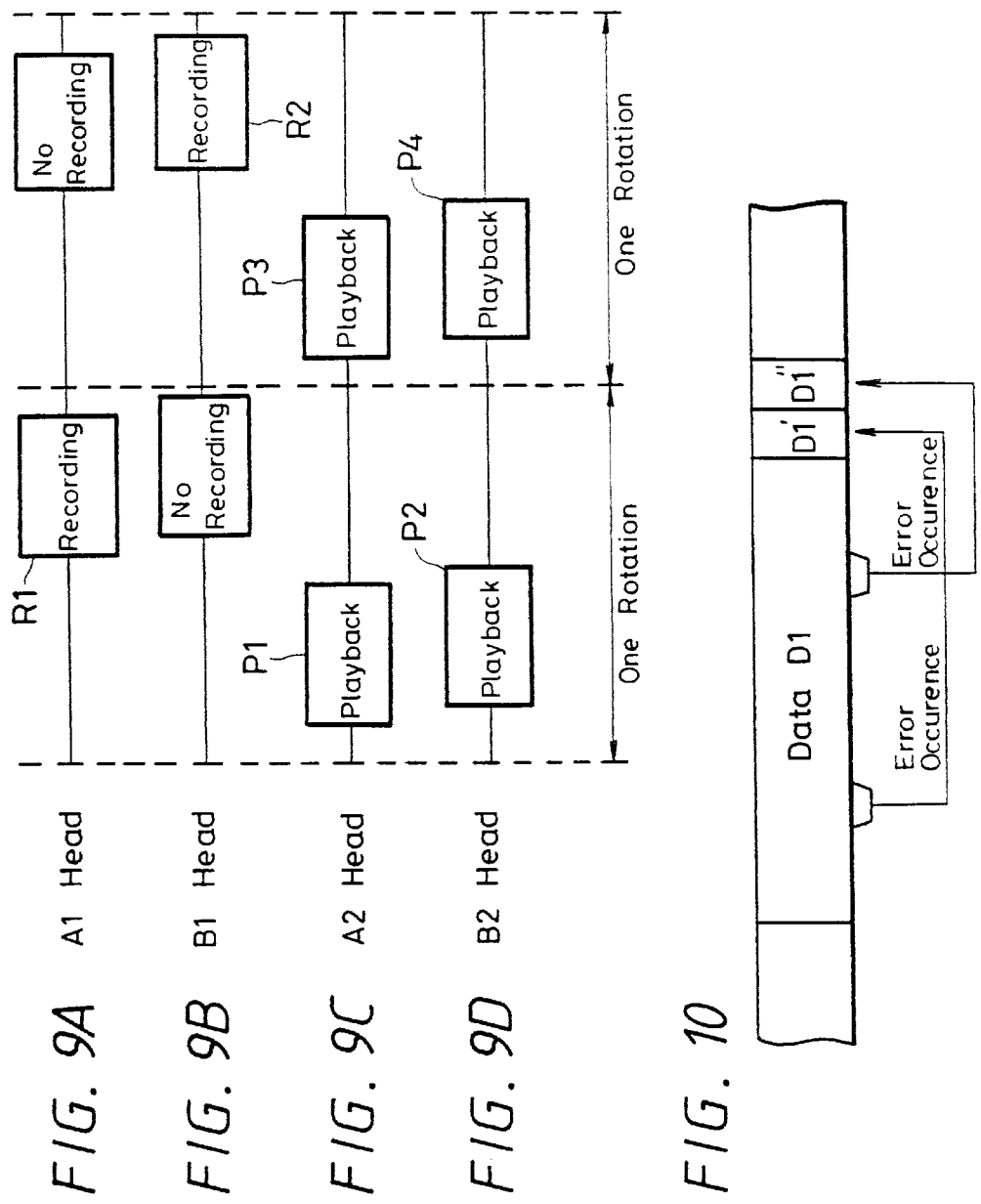

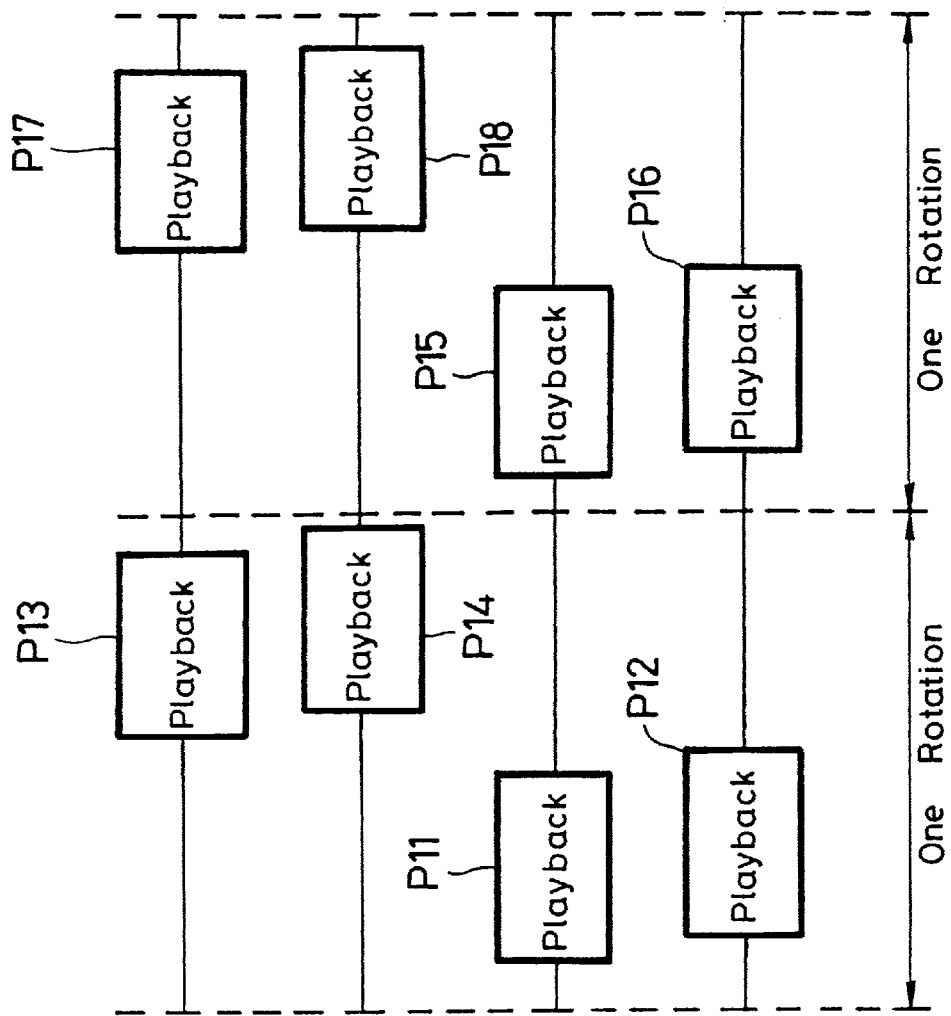

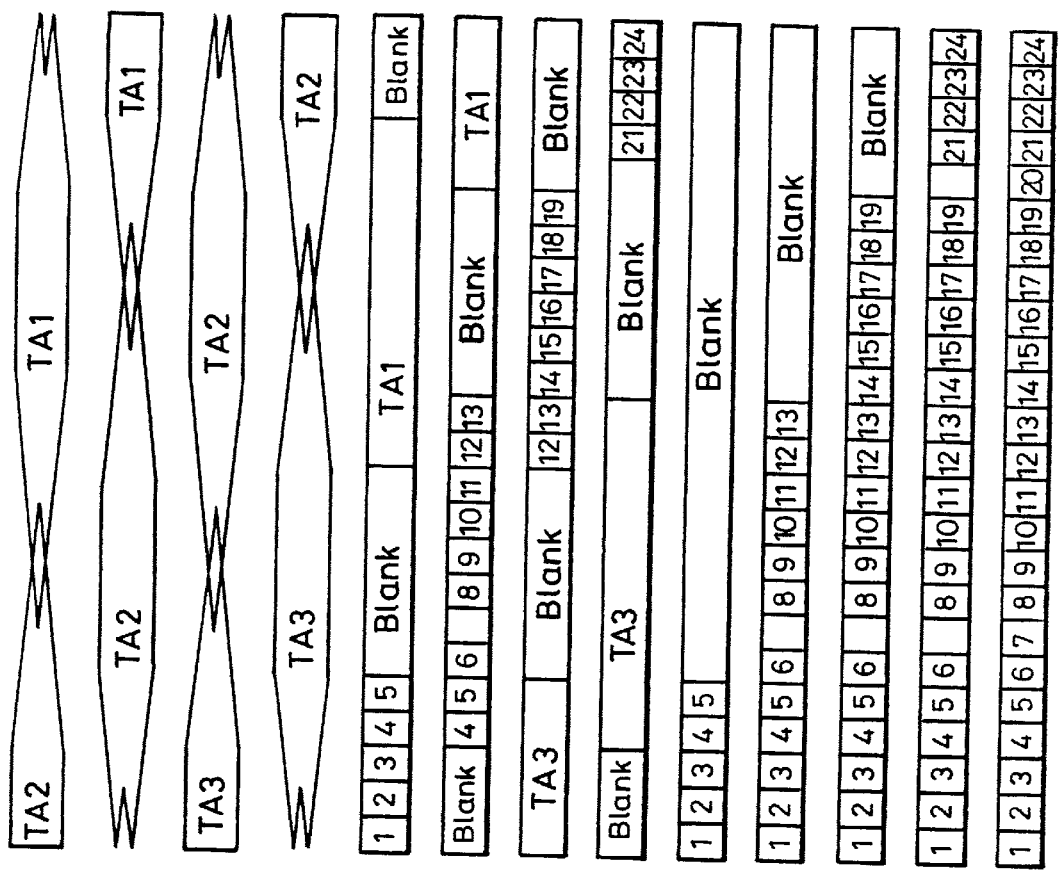

MAGNETIC TAPE RECORDING AND REPRODUCING APPARATUS HAVING FOUR HEADS AND TWO AZIMUTH ANGLES

This is a continuation of application Ser. No. 08/492,698 filed Jun. 20, 1995, abandoned.

BACKGROUND OF THE INVENTION

1. Field of the Invention:

The present invention relates to a magnetic tape recording and reproducing apparatus suitable for use in a data recording and reproducing apparatus called a data streamer.

2. Description of the Related Art:

There have been developed various kinds of recording and reproducing apparatus each of which records digital data on a magnetic tape and reproduces the recorded data by using a magnetic head disposed on a rotary head drum. The recording and reproducing apparatus using the rotary head drum records data such that tracks slanted relative to the longitudinal direction of the magnetic tape are successively formed.

In this case, since it is usually required upon reproduction to effect a tracking control for controlling the magnetic head to accurately trace the tracks formed on the magnetic tape and hence to accurately control a tape travel system, the rotation phase of the rotary head drum and an arrangement of the recording and reproducing apparatus becomes complicated. Moreover, since it is necessary to widen a track width to the extent that the magnetic head can trace the track accurately, this necessity to widen the track width becomes a bar to an increase of the recording density with which data are recorded on the magnetic tape.

In order to solve the above problem, the assignee of this application developed a recording and reproducing apparatus which can reproduce recorded data from a magnetic tape accurately in a so-called non-tracking system in which the tracking control and so on are not required. FIG. 1 shows an arrangement of a rotary head drum 1 of the recording and reproducing apparatus. A magnetic head $A_R$ and a magnetic head B are disposed at predetermined positions adjacent or close to each other on the rotary head drum 1. In this case, the magnetic head $A_R$ and the magnetic head B have azimuth angles which are different from each other. The magnetic head $A_R$ is used only for recording, and the magnetic head B is used for both recording and reproduction. A magnetic head $A_P$ used only for reproduction is disposed on the rotary head drum 1 at a position which is 180° apart from the magnetic head B, i.e., opposite thereto on the same diameter of the rotary head drum 1. An azimuth angle of the magnetic head $A_P$ is set equal to that of the magnetic head $A_R$ used only for recording. A magnetic tape T is wrapped around the rotary head drum 1 and brought in contact therewith for about 100°.

A process carried out when the recording and reproducing apparatus records data will be described with reference to FIGS. 2A to 2C and 4. Initially, the magnetic tape T is traveled at a constant speed and the rotary head drum 1 is rotated at a predetermined speed. While the rotary head drum 1 makes a first rotation, as shown in FIG. 2A, the magnetic head $A_R$ scans the magnetic tape T and records data thereon (this recording is represented by a reference symbol Ra in FIG. 2A) to form a slant track Ta of one recording azimuth angle as shown in FIG. 4. While the rotary head drum 1 makes a second rotation, as shown in FIG. 2B, the magnetic head B scans the magnetic tape T and records data thereon (this recording is represented by a reference symbol Rb in FIG. 2B) to form a slant track Tb of the other recording azimuth angle as shown in FIG. 4 at a portion adjacent to the track Ta. Hereinafter, the tracks Ta and Tb are alternately formed during every one rotation of the rotary head drum 1.

In this case, as shown in FIGS. 2A and 2B, while the rotary drum head 1 is rotated and one of the magnetic heads $A_R$ and B records data on the magnetic tape T, the other of the two does not record data thereon. The magnetic head $A_P$ used only for the reproduction is not used during the recording as shown in FIG. 2C.

Subsequently, a process carried out when the recording and reproducing apparatus reproduces data will be described with reference to FIGS. 3A to 3C and 4. Similar to the recording process in this case, the magnetic tape T is traveled at a constant speed and the rotary head drum 1 is rotated at a predetermined speed (which is the same as that used upon the recording). While the rotary head drum 1 makes a first rotation, as shown in FIG. 3B, the magnetic head B scans the magnetic tape T and reproduces data therefrom (this reproduction is represented by a reference symbol Pa in FIG. 3B). After the reproduction Pa is carried out and the rotary head drum 1 is rotated by about 180°, as shown in FIG. 3C, the magnetic head $A_P$ scans the magnetic tape T and reproduces data therefrom (this reproduction is represented by a reference symbol Pb in FIG. 3C). Respective loci of the magnetic heads B and $A_P$ produced when they trace the tracks in the reproduction Pa and the reproduction Pb are loci La and Lb not shown in FIG. 4.

While the rotary head drum 1 makes a second rotation, as shown in FIG. 3B, the magnetic head B scans the magnetic tape T and reproduces data therefrom (this reproduction is represented by a reference symbol Pc in FIG. 3B). After the reproduction Pc is carried out and the rotary head drum 1 is rotated by about 180°, as shown in FIG. 3C, the magnetic head $A_P$ scans the magnetic tape T and reproduces data therefrom (this reproduction is represented by a reference symbol Pd in FIG. 3C). At this time, not shown in FIG. 4, respective loci Lc, Ld of the magnetic heads B and $A_P$ during the reproduction Pc and the reproduction Pd are displaced from the loci La, Lb by an amount of about one-track width. The magnetic head $A_R$ used only for recording is not used during the reproduction as shown in FIG. 3A. A comparison between the recording process shown in FIGS. 2A to 2C and the reproduction process shown in FIGS. 3A to 3C reveals that in the reproduction process data is reproduced with a density that is twice as high as that of the recording density.

When such reproduction is carried out, a signal reproduced from the track Ta with one recording azimuth angle is obtained in the reproduction Pa and the reproduction Pc carried out by the magnetic head B, and a signal reproduced from the track Tb with the other recording azimuth angle is obtained in the reproduction Pb and the reproduction Pd carried out by the magnetic head $A_P$. Since the tracking control is not effected during the reproduction in this system, in that the loci of the magnetic heads B and $A_P$ do not correspond to the tracks formed on the magnetic tape T as shown in FIG. 4, it is possible to substantially obtain a complete recording signal of one track Ta by synthesizing the signals obtained by the reproduction Pa and the reproduction Pc. Similarly, it is possible to substantially obtain a complete recording signal of one track Tb by synthesizing the signals obtained by the reproduction Pb and the reproduction Pd.

When data is reproduced with a density that is twice as high as the recording density as described above, it is possible to reproduce recording signals accurately without tracking control. Accordingly, in this non-tracking system, it is possible to set a track width regardless of the tracking control upon the reproduction, and it is possible to realize a high recording density. In the above-mentioned example, although data is reproduced at a density that is twice as high as the recording density, the rotary head drum 1 is rotated at the same constant speed during both the recording and reproduction processes. Therefore, it is possible to simplify an arrangement of a drive system for the rotary head drum 1.

When a signal recorded by the recording and reproducing apparatus of this system is an audio signal, even if a signal obtained by such a reproduction process has a blank portion, a signal at the blank portion is estimated by interpolation to obtain an audio signal sufficient to be used in the reproduction process. However, when data such as a computer program or the like is recorded, it is necessary to completely prevent reproduced signal from having a blank. The above necessity is not satisfied by the recording and reproduction processes of the recording and reproducing apparatus of the above system. Moreover, when data such as a computer program or the like is recorded, it is necessary to record such recording data which is completely free from any blank portion.

SUMMARY OF THE INVENTION

In view of such aspects, it is an object of the present invention that data such as a computer program or the like can be recorded and reproduced accurately in a recording and reproducing apparatus of a non-tracking system which can improve a recording density under a simple control.

According to a first aspect of the present invention, a recording and reproducing apparatus for recording and reproducing a data signal on and from a magnetic tape includes a rotary head drum, first and second magnetic heads, third and fourth magnetic heads, data processing means, data signal decoding means, and control means. A magnetic tape is wrapped around the rotary drum so as to be slanted at a predetermined angle. The first and second magnetic heads are provided on the rotary drum at positions apart from each other by a predetermined rotational angle and have a first azimuth angle. The third and fourth magnetic heads are provided on the rotary drum at positions apart from each other by a predetermined rotational angle and have a second azimuth angle different from the first azimuth angle. The data processing means adds address data to each recording unit of the data signal and outputs the data signal as a recording signal. The data signal decoding means decodes the data signal from the recorded signals reproduced by the first, second, third and fourth magnetic heads based on the address data included in the recording signal. The control means, upon the recording, supplies the recording signal to the first magnetic head and the second magnetic head alternately at each rotation of the rotary drum to record the same on the magnetic tape and, upon the reproduction, supplies the recorded signals reproduced by the first, second, third and fourth magnetic heads to the data signal decoding means.

According to a second aspect of the present invention, the data processing means adds an error correction code to each of the recording units of the data signal to output the data signal as the recording signal.

According to a third aspect of the present invention, the recording and reproducing apparatus further includes error detecting means for detecting an error of the recording signal by using the error correction code. Upon recording, the control means controls the third and fourth magnetic heads to reproduce recording signals recorded on the magnetic tape by the first and second magnetic heads and discriminates a recorded state of the recording signal on the magnetic tape by supplying the reproduced recording signal to the error detecting means.

According to a fourth aspect of the present invention, the data signal is supplied from external equipment. The recording and reproducing apparatus further includes storage means for storing address data of a recorded signal determined by the error detecting means as one having no error, and error reporting means for supplying an address of a data signal whose address data is not stored in the storage means as an address of a data signal having an error to the external equipment upon the end of recording.

According to a fifth aspect of the present invention, the recording unit is set smaller than one track.

According to a sixth aspect of the present invention, a transfer speed of the magnetic tape and a rotation speed of the rotary drum upon recording are set equal to those upon reproduction.

According to a seventh aspect of the present invention, reproduction of a non-tracking system is carried out upon reproduction.

According to an eighth aspect of the present invention, the recording and reproducing apparatus for recording and reproducing the data signal on and from the magnetic tape includes the rotary drum, the first and second magnetic heads, the third and fourth magnetic heads, the data processing means, the data signal decoding means, the error detection means, and the control means. The magnetic tape is wrapped around the rotary drum so as to be slanted at a predetermined angle. The first and second magnetic heads are provided on the rotary drum at positions apart from each other by a predetermined rotational angle and have the first azimuth angle. The third and fourth magnetic heads are provided on the rotary drum at positions apart from each other by a predetermined rotational angle and have the second azimuth angle different from the first azimuth angle. The data processing means adds address data and an error correction code to each recording unit of a data signal and outputs the data signal as the recording signal. The data signal decoding means decodes the data signal from the recorded signals reproduced by the first, second, third and fourth magnetic heads based on the address data included in the recording signal. The error detection means detects an error of the recording signal by using the error correction code. Upon recording, the control means supplies the recording signal to the first magnetic head and the second magnetic head alternately at each rotation of the rotary drum to record the same on the magnetic tape, controls the third and fourth magnetic heads to reproduce recording signals recorded on the magnetic tape by the first and second magnetic heads, and discriminates the recorded state of the recording signal on the magnetic tape by supplying the reproduced recording signal to the error detecting means.

According to a ninth aspect of the present invention, the data signal is supplied from external equipment. The recording and reproducing apparatus further includes storage means for storing address data of a recorded signal determined by the error detecting means as one having no error, and error reporting means for supplying an address of the data signal whose address data is not stored in the storage means as an address of the data signal having the error to the external equipment upon the end of recording.

BRIEF DESCRIPTION OF THE DRAWINGS

FIGS. 2A to 2C are diagrams showing timings of a recording process according to the prior art;

FIGS. 3A to 3C are diagrams showing timings of a reproducing process according to the prior art;

FIGS. 9A to 9D are diagrams showing timings of a recording process according to the present invention;

FIG. 10 is a diagram used to explain a recorded state according to the present invention;

FIGS. 11A to 11D are diagrams showing timings of a reproducing process according to the present invention;

FIGS. 14A to 14M are diagrams showing a data reproduction state according to the present invention.

DETAILED DESCRIPTION OF THE PREFERRED EMBODIMENT

An embodiment according to the present invention will hereinafter be described with reference to FIGS. 5 through 14.

Figure 1:
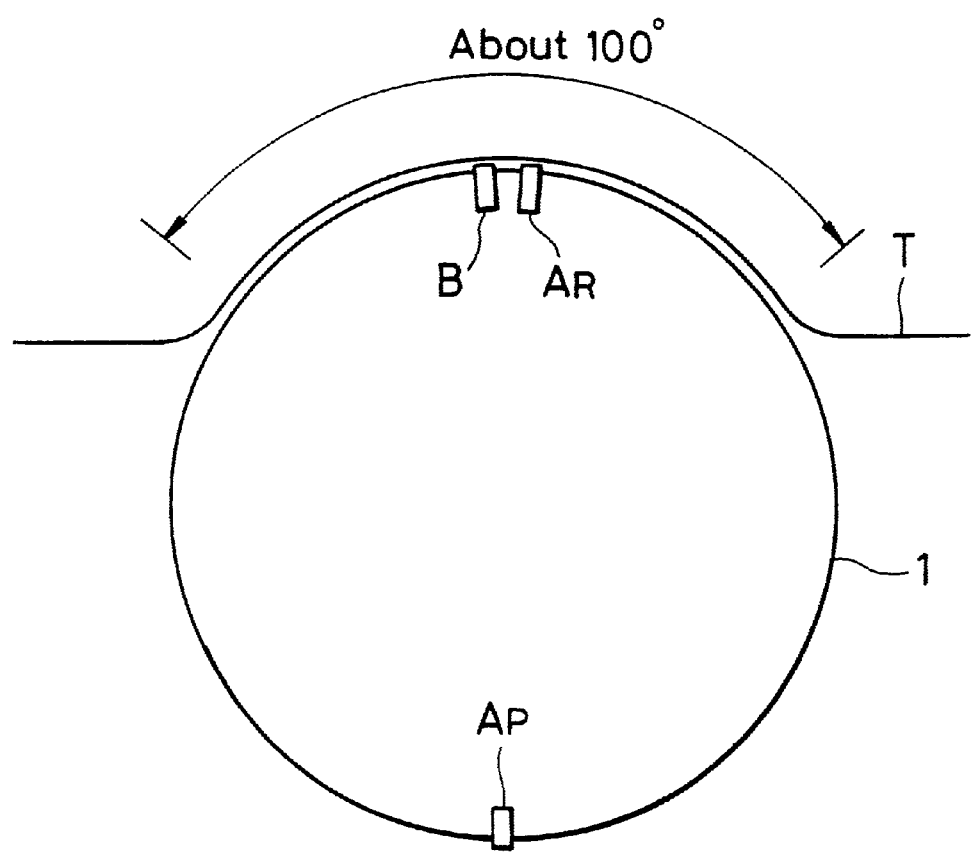
FIG. 1 is a diagram used to explain an arrangement of a rotary head drum according to a prior art.
Figure 4:
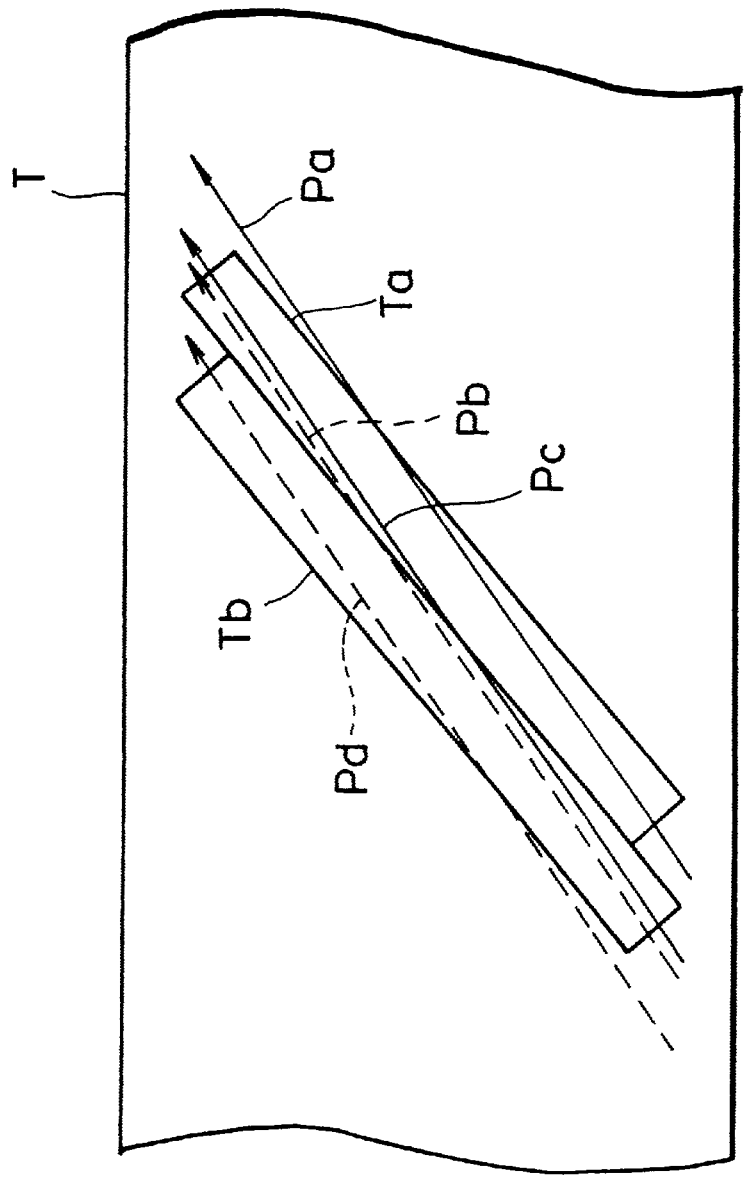
FIG. 4 is a diagram used to explain a recording and reproduction state according to the prior art by using a track pattern on a magnetic tape.
Figure 5:
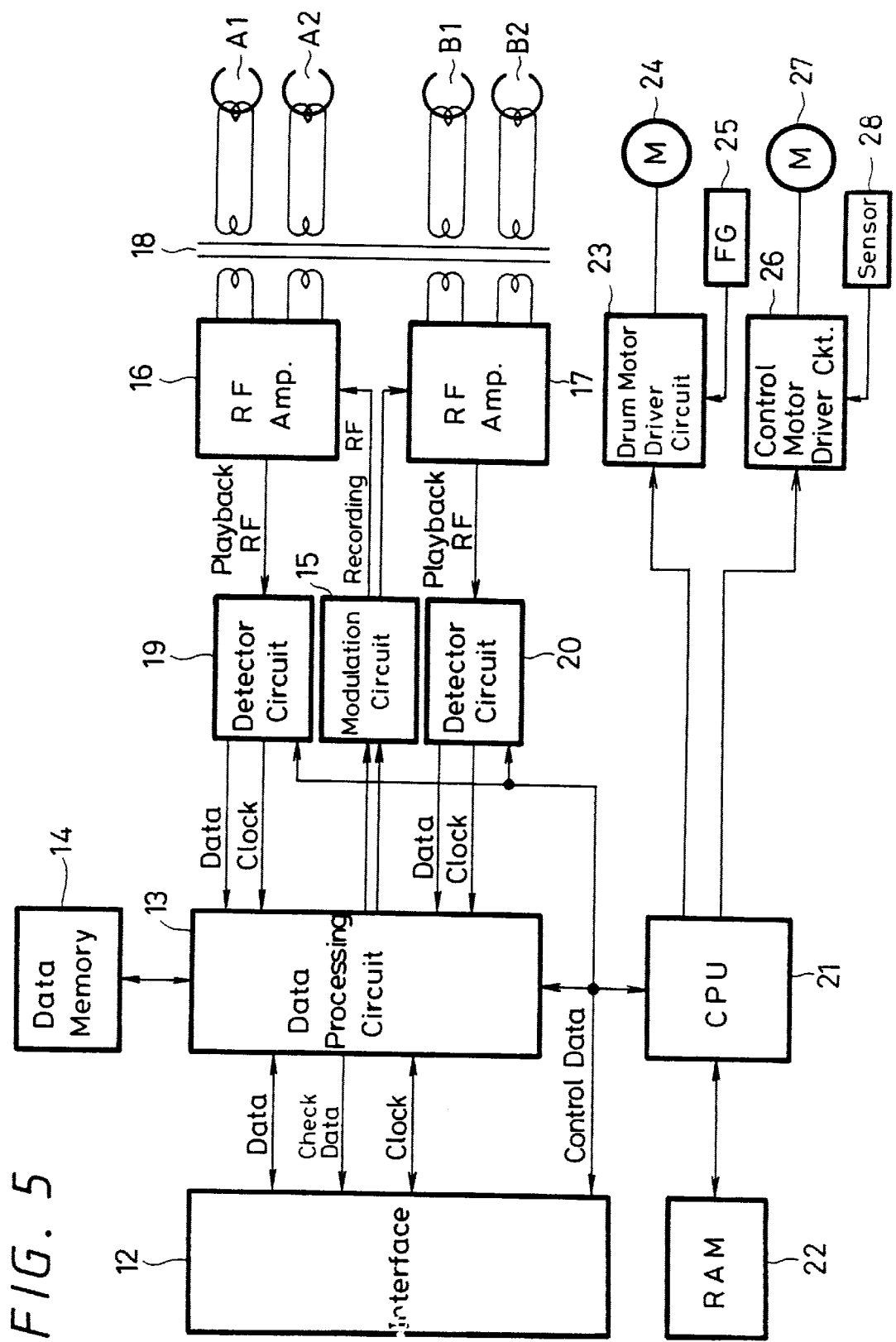
FIG. 5 is a diagram showing an arrangement of a data streamer according to the present invention.
Figure 6:
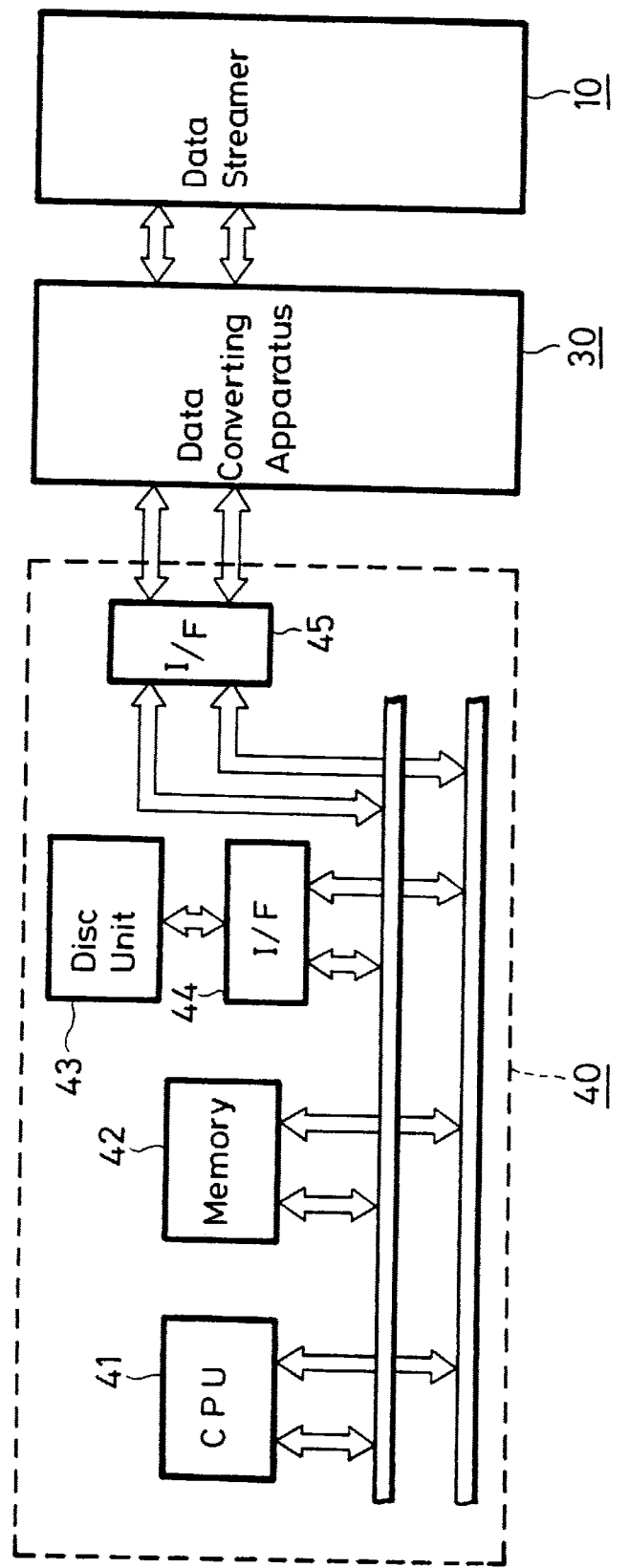
FIG. 6 is a diagram showing a system arrangement according to the present invention.

In this embodiment, the present invention is applied to a data streamer for recording and reproducing data used for a computer. FIG. 5 shows an arrangement of the data streamer, and FIG. 6 shows an arrangement of an external equipment (such as a host computer or the like) connected to the data streamer.

The arrangement of the data streamer will be described with reference to FIG. 5 initially. An interface 12 supplies data supplied thereto from an external equipment to a data processing circuit 13. The data processing circuit 13 is connected with a data processing memory 14 and converts the data supplied thereto from an external equipment into recording data. Specifically, the data processing circuit 13 divides the data supplied thereto from the external equipment into predetermined data blocks and adds data of a block number and an error correction code to the actual data of each of the data blocks. The data processing circuit 13 converts the reproduced data into output data. The data processing circuit 13 is operated under the control of a central processing unit (CPU) 21, i.e., a microcomputer which controls the operations of the respective units of the data streamer.

The recording data obtained by the data processing circuit 13 is subjected to a modulation processing for the recording by a modulation circuit 15 to obtain a recording RF signal. The recording RF signal is supplied to RF amplifiers 16, 17.

In this case, each of the recording data of a one-track amount is alternately supplied to the RF amplifiers 16, 17 (data of a one track amount is formed of plural blocks). The RF amplifier 16 is connected through a rotary transducer 18 with magnetic heads A1, A2 in a rotary head drum (not shown in FIG. 5). The recording RF signal amplified by the RF amplifier 16 is supplied to the magnetic head A1 which records the recording RF signal on a magnetic tape (not shown in FIG. 5). The RF amplifier 17 is connected through the rotary transducer 18 with magnetic heads B1, B2 in the rotary head drum. The recording RF signal amplified by the RF amplifier 17 is supplied to the magnetic head B1 which records the recording RF signal on the magnetic tape.

Signals reproduced by the magnetic heads A1, A2 are supplied through the rotary transducer 18 to the RF amplifier 16. A detector circuit 19 demodulates the reproduced RF signal obtained in the RF amplifier 16 by amplifying the reproduced signals, detecting the reproduced data and its clock component, and supplying them to the data processing circuit 13.

Further, signals reproduced by the magnetic heads B1, B2 are supplied through the rotary transducer 18 to the RF amplifier 17. A detector circuit 20 demodulates the reproduced RF signal obtained in the RF amplifier 17 by amplifying the reproduced signals, detecting the reproduced data and its clock component, and supplying them to the data processing circuit 13.

The data processing circuit 13 carries out a synthesizing process in which reproduced data is restored to data of one track each by using the data memory 14. The data processing circuit 13 also carries out an error detection processing and an error correction processing by using the error correction code added to the reproduced data. When data of one track is completely restored through the above-mentioned processings, the data of one track is supplied to the interface 12 together with the clock and they are transmitted from the interface 12 to an external equipment.

In this embodiment, when data is recorded by using the magnetic heads A1, B1, the recorded data is reproduced by using the magnetic heads A2, B2 soon after being recorded. Further, the data processing circuit 13 is supplied with the data reproduced by the magnetic heads A2, B2 and subjects each of blocks of the reproduced data to error detection by using the error correction code included in the reproduced data. The data processing circuit 13 adds data indicative of whether or not there is a detected error with address data of each block and supplies the former through the interface 12 to an external equipment.

The CPU 21 of this embodiment is connected with a RAM 22 which stores a control program and so on. In accordance with a command from the CPU 21, a rotary head drum motor 24 is rotated at a predetermined speed under the control of a drum motor driver circuit 23. In this case, a frequency generator (FG) 25 detects a rotation state of the rotary head drum. A control motor 27 for wrapping the magnetic tape around the rotary head drum and so on is driven under the control of a control motor driver circuit 26 in accordance with a command from the CPU 21. In this case, a sensor 28 detects a wound state of the magnetic tape and so on.

Figure 7:
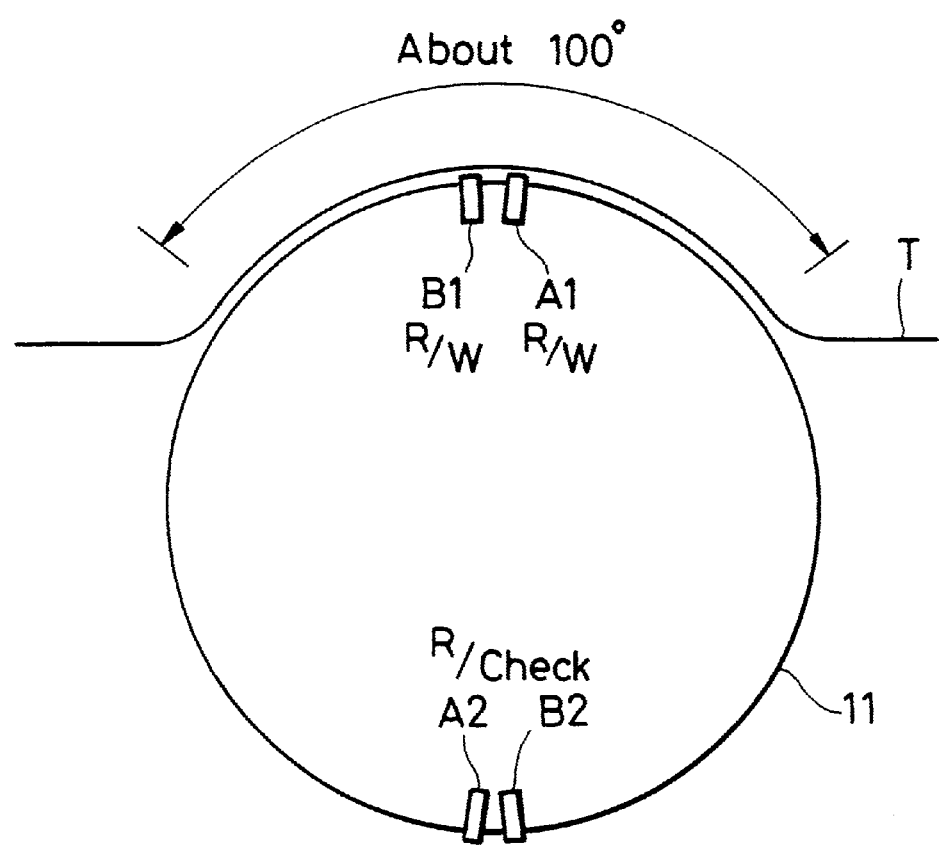
FIG. 7 is a diagram used to explain an arrangement of a rotary head drum according to the present invention.

FIG. 7 shows an arrangement of magnetic heads on a rotary head drum 11 according to this embodiment. The magnetic heads A1, B1 are disposed on the rotary head drum 11 at respective predetermined positions close to each other. The magnetic heads A1, B1 have different azimuth angles. The magnetic heads A1, B1 are attached to positions displaced from each other by one track amount in the height direction of the rotary head drum 11. The magnetic heads A1, B1 are used for both recording and reproduction.

Magnetic heads A2, B2 are used only for reproduction, and are respectively disposed at positions which are close to each other and 180° apart from the magnetic heads A1, B1, i.e., opposite thereto on the same diameters of the drum. The magnetic heads A2, B2 also have different azimuth angles. The magnetic heads B1, B2 are attached to positions displaced from each other by one track amount in the height direction of the rotary head drum 11. The magnetic heads A1, A2 have the same azimuth angle, and the magnetic heads B1, B2 have the same azimuth angle.

One pair of the magnetic heads A1, B1 and the other pair of the magnetic heads A2, B2 are disposed from each other by several track amounts (six tracks in this embodiment) in the height direction of the rotary head drum 11. The magnetic tape T is wound around the rotary head drum 1 for about 100°.

Figure 8:
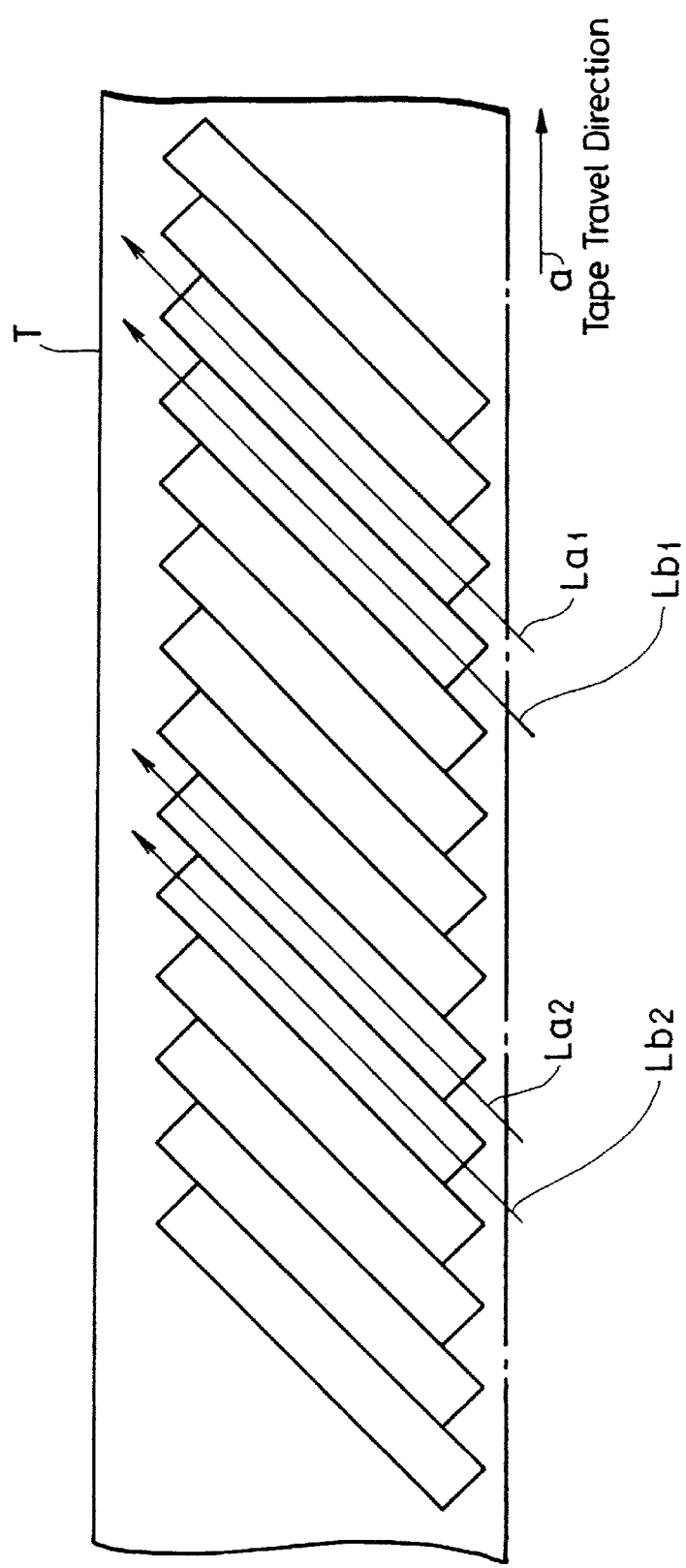
FIG. 8 is a diagram used to explain how magnetic heads according to the present invention trace tracks.

Since the four magnetic heads are disposed on the rotary head drum 11 as described above, the magnetic heads scan the tracks as shown in FIG. 8 when the rotary head drum 11 makes one rotation. Specifically, when the rotary head drum 11 makes one rotation and the magnetic head A1 scans a track on a locus La1 shown in FIG. 8, the magnetic head B1 scans a track immediately succeeding the track scanned by the magnetic head A1 in the tape travel direction a on a locus Lb1. The magnetic head A2 scans on a locus La2 shown in FIG. 8, six tracks succeeding from the track scanned by the magnetic head A1 in the tape travel direction a. The magnetic head B2 scans on a locus Lb2 shown in FIG. 8 six tracks succeeding from the track scanned by the magnetic head B1 in the tape travel direction a.

This embodiment employs a system in which the magnetic tape is recorded and reproduced in both directions. When a tape cassette housing a magnetic tape is loaded into a data streamer with the front surface of the cassette being faced upward, an upper portion of the magnetic tape is used for recording and reproduction in one direction. When the tape cassette is loaded thereinto with the front surface of the cassette being faced downward, a lower portion of the magnetic tape is used for recording and reproduction in the other direction. Figures showing tape patterns, e.g., FIG. 8 and so on, show only recording and reproduction patterns in one direction.

This embodiment does not employ a tracking control for adjusting the scanning loci of the magnetic heads to the recording tracks when data is reproduced.

FIG. 6 shows an arrangement of the external equipment connected to the data streamer having the above-mentioned arrangement. The data streamer 10 is connected through a data converting apparatus 30 to a host computer 40. The host computer 40 includes a central processing unit (CPU) 41 which is the main arithmetic processing unit of the host computer 40, a memory 42 for storing data used in the arithmetic processing, and a disc unit 43 which is a large-capacity data storage unit using some suitable means such as a hard disc or the like. The disc unit 43 is connected through an interface 44 to bus lines used for transmitting data to respective units. The bus lines include a bus line for transmitting data and a bus line for transmitting address data of the transmission data. The respective bus lines are connected to an interface 45 for connecting the data converting apparatus 30 to the host computer 40.

The data converting apparatus 30 converts data transmitted thereto from the interface 45 of the host computer 40 into data having an arrangement the data streamer 10 can receive, and transmits the converted data to the interface 12, shown in FIG. 5, of the data streamer 10. The data converting apparatus 30 converts data transmitted from the interface 12 of the data streamer 10 into data having an arrangement the host computer 40 can receive, and transmits the converted data to the interface 44 of the host computer 40.

There will be described herein a process carried out when the data streamer according to this embodiment records data supplied from the host computer 40 on the magnetic tape. FIG. 9 shows a recording timing according to the present invention. While the rotary head drum 11 makes a first rotation, as shown in FIGS. 9C and 9D, the magnetic heads A2, B2 respectively reproduce two adjacent tracks at timings P1, P2 at which the magnetic heads A2, B2 scan the magnetic tape T (in this case, when the recording is started, the magnetic heads A2, B2 reproduce portions with no recording track). As shown in FIG. 9A, the magnetic head A1 records data of one track amount on the magnetic tape T at a timing R1 where the magnetic head A1 scans the magnetic tape T. At this same time, as shown in FIG. 9B, the magnetic head B1 does not record data even at a timing which the magnetic head B1 scans the magnetic tape T.

While the rotary head drum 11 makes the next rotation, as shown in FIGS. 9C, 9D, the magnetic heads A2, B2 respectively reproduces two adjacent tracks at timings P3, P4 at which the magnetic heads A2, B2 scan the magnetic tape T. As shown in FIG. 9B, the magnetic head B1 records data of one track amount on the magnetic tape T at a timing R2 where the magnetic head B1 scans the magnetic tape T. At this same time, as shown in FIG. 9A, the magnetic head A1 does not record data even at a timing at which the magnetic head A1 scans the magnetic tape T.

As described above, each time the rotary head drum 11 makes one rotation, data of one track amount is recorded. Since the magnetic heads A1, B1 having different azimuth angles are alternately used for the recording at this time, a track having one azimuth angle and a track having the other azimuth angle are alternately formed.

Since the magnetic heads A2, B2 other than the magnetic heads A1, B1 which record data, reproduce data, recorded signals are immediately reproduced. In this embodiment, as shown in FIG. 8, tracks scanned by the recording heads A2, B2 are six-tracks behind from the tracks scanned by the magnetic heads A1, B1 in the tape travel direction a, respectively. Therefore, after each of the magnetic heads A1, B1 records six tracks since the start of the recording, recorded signals are reproduced by the magnetic heads A2, B2 and thereafter recorded signals on tracks which are six-tracks behind from tracks being recorded in the tape travel direction a are reproduced thereby.

Reproduced data, detected from signals reproduced during the recording, are supplied to the data processing circuit 13 as shown in FIG. 5. The data processing circuit 13 subjects each block of the reproduced data to error detection by using the error correction code included in the reproduced data. When the error correction code is not detected in a block, the data processing circuit 13 transmits the address data (a track number and a block number) of the block through the interface 12 to the data converting apparatus 30 as shown in FIG. 6. Since the transmitted block has had no error detected, it is natural that its address data has already been detected from the reproduced data. The data converting apparatus 30 stores the transmitted address data. If it is detected that a block has an error, address data of the block is not transmitted to the data converting apparatus 30. Thus, it is possible for the data converting apparatus 30 to detect a block having an error.

When the recording of data of one unit supplied from the host computer 40 onto the magnetic tape T is finished, the data converting apparatus 30 issues to the host computer 40 a command to transmit the data of the block having an error to the data converting apparatus 30 therefrom again. Specifically, the data converting apparatus 30 transmits the address data of the block having the error to the host computer 40. The data converting apparatus 30 transmits the data output from the host computer 40 in accordance with the command to the data streamer 10 to record the data on the magnetic tape T again. At this time, similarly, as shown in FIGS. 9A to 9D, recorded signals are immediately reproduced, the data processing circuit 13 subjects the reproduced data to the error detection and the data converting apparatus 30 detects whether or not each of blocks of the reproduced data has a recording error. If the recording error is detected, then the data converting apparatus 30 repeats a processing for recording the same data on the magnetic tape T.

In such recording, as shown in FIG. 10, when data D1 of one unit is recorded on a predetermined portion of the magnetic tape T, of that recorded data D1, data having an error is recorded again as data D1' or data D1" on a portion succeeding the portion where the data D1 is recorded. The data D1' or data D1" recorded again at this time is not only data of the block which had the error but also data adjacent to the data of the block so as to set the data D1', D1" as at least data of a several-track amount.

Since the above-mentioned recording process is carried out, the data supplied to the data streamer 10 can be reliably recorded on the magnetic tape T. Therefore, it is possible to reliably store the data. In this case, since the signals reproduced soon after recording are subjected to error correction by only using the error correction code, it is easy to determine whether or not a block includes an error without resorting to any processes such as checking the recorded data and the reproduced data with each other, or the like. Therefore, it is possible to reliably record data with circuits having simple arrangements.

While the portions of data having the errors are recorded on another portion of the magnetic tape T as shown in FIG. 10, when the data D1, D1' and D1" are reproduced, it is possible to reproduce that data D1, D1' and D1" as continuous data of one unit by controlling positions from which the data is reproduced in response to the state of the errors under the control of the data converting apparatus 30 (or the host computer 40).

There will be described with reference to FIG. 11 a process in which the data streamer 10, according to this embodiment, reproduces recorded data from the magnetic tape T and supplies reproduced data to the host computer 40. FIG. 11 shows a reproduction timing according to the present invention. While the rotary head drum 11 makes a first rotation, as shown in FIG. 11C and 11D, the magnetic heads A2, B2 respectively reproduce two adjacent tracks from the magnetic tape T at timings P11, P12 where the magnetic heads A2, B2 scan the magnetic tape T. As shown in FIGS. 11A and 11B, the magnetic heads A1, B1 respectively reproduce two adjacent tracks at timings P13, P14 where the magnetic heads A1, B1 scan the magnetic tape T. The timings P13, P14 are six-track widths prior to the timings P11, P12.

While the rotary head drum 11 makes the next rotation, similarly, as shown in FIG. 11C and 11D, the magnetic heads A2, B2 respectively reproduce two adjacent tracks from the magnetic tape T at timings P15, P16 where the magnetic heads A2, B2 scan the magnetic tape T. Then, as shown in FIGS. 11A and 11B, the magnetic heads A1, B1 respectively reproduce two adjacent tracks at timings P17, P18 where the magnetic heads A1, B1 scan the magnetic tape T.

Thereafter, the reproduction with all four of the magnetic heads A1, A2, B1 and B2 is repeated at every rotation of the rotary head drum 11.

Figure 12:
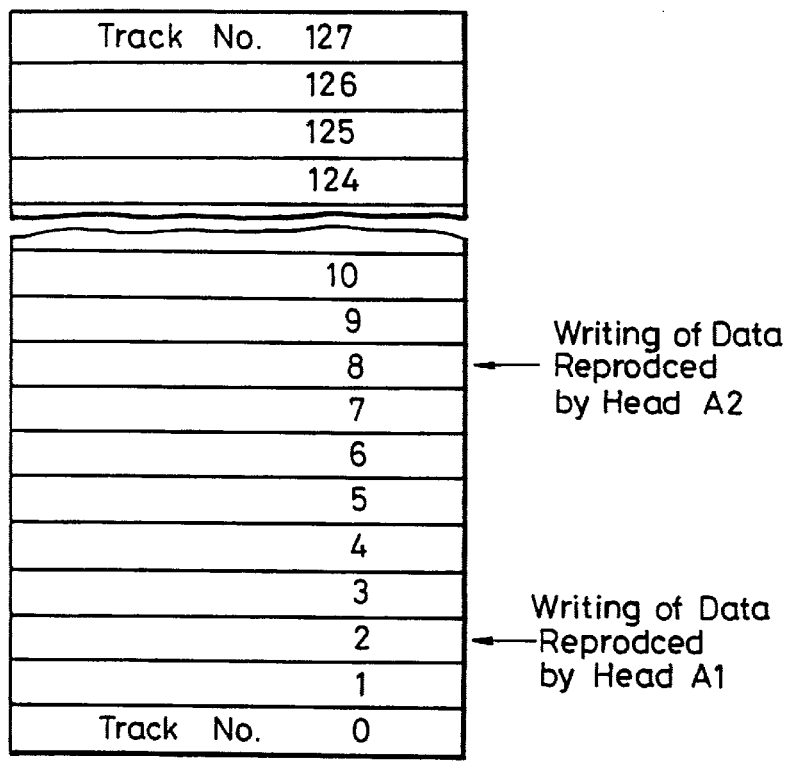
FIG. 12 is a diagram used to explain an arrangement of areas of a memory according to the present invention.

Reproduced data detected from the reproduction RF signal is written in the data memory 14 connected to the data processing circuit 13. An arrangement of the data memory 14 will be described. The data memory 14 according to this embodiment has a memory storage area of a 128 track amount as shown in FIG. 12. After data is successively written in the areas from the area of track number 0 to the area of a track number 127, the data is written in the area of track number 0 again, i.e., the storage area of 128 track amount is used circularly.

When the magnetic head A1 reproduces a signal recorded on the track of track number 2 at a certain timing, data reproduced at this time is stored at a corresponding block position in the area of track number 2 in the data memory 14. A signal of a track reproduced by the magnetic head A2 at the timing is a recorded signal of the track of track number 8, six-track widths behind the track reproduced by magnetic head A1 at the same timing. Reproduced data of the track of track number 8 is stored at a corresponding block position in the area of track number 8. In this case, even if data reproduced by the magnetic head A1 is already stored in the area of the track number 8, data reproduced by the magnetic head A2 is written therein to update the data.

Figure 13:
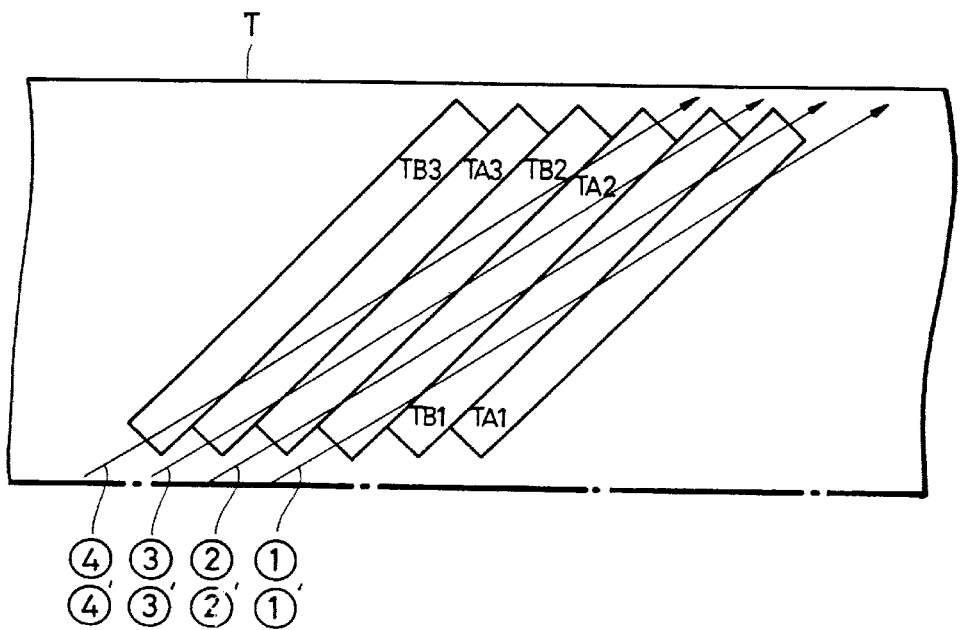
FIG. 13 is a diagram used to explain loci of the magnetic heads on a magnetic tape upon reproduction according to the present invention.

When the above reproduction process is carried out, the data recorded on each of the tracks of the magnetic tape T is reproduced with a density which is four times higher than the recording density and a scanning density of the reproducing heads obtained upon reproduction is also sufficiently higher. Therefore, it becomes possible to completely reproduce the data recorded on the magnetic tape. This will hereinafter be described with reference to FIG. 13 which shows an example of an actual reproduction state. As shown in FIG. 13, tracks on which data is recorded, i.e., tracks TA1, TB1, TA2, TB2, . . . are formed on the magnetic tape T. In this case, the tracks TA1, TA2, . . . have a recording azimuth angle which allows the magnetic heads A1, A2 to reproduce the tracks TA1, TA2, . . ., and the tracks TB1, TB2, . . . have a recording azimuth angle which allows the magnetic heads B1, B2 to reproduce the tracks TB1, TB2.

The track TA2 having the recording azimuth angle which allows the magnetic heads A1, A2 to reproduce the track TA2 will mainly be described. It is assumed that initially, the magnetic head A1 scans the magnetic tape on a locus ①, and the magnetic head A1 scans the magnetic tape on a locus ② after one rotation of the rotary head drum 11. Thereafter, the magnetic head A1 successively scans the magnetic tape on loci ③, ④ . . . at every rotation of the rotary head drum 11. At this time, the loci ①, ②, ③, and ④ are displaced at an interval of one track pitch.

It is assumed that after the rotary head drum 11 makes six rotations since the magnetic head A1 initially scanned the magnetic tape T on the locus ①, the magnetic head A2 scans the magnetic tape T on a locus ①', which is substantially the same as the locus ①, and the magnetic head A2 scans the magnetic tape T on a locus ②' after the rotary head drum 11 makes one more rotation. The magnetic head A2 successively scans the magnetic tape T on loci ③', ④' . . . at every rotation of the rotary head drum 11. These loci are slightly slanted relative to the tracks as shown in FIG. 13.

In such scanning, when the magnetic tape T is scanned by the magnetic head A1 on the loci ①, ②, ③, ④, respective RF signals are reproduced as shown in FIGS. 14A, 14B, 14C and 14D. Specifically, as shown in FIG. 14A, a little part of the signal of the track TA2 is reproduced at the beginning of the scanning on the locus ①, and a signal of the track TA1 is reproduced in the rest of the scanning on the locus ①. As shown in FIG. 14B, the signal of the track TA2 is initially reproduced in the scanning on the locus ②, and a little part of the signal of the track TA1 is reproduced in an end part of the scanning on the locus ②. As shown in FIG. 14C, a little part of the signal of the track TA3 is reproduced at the beginning of the scanning on the locus ③, and a signal of the track TA2 is reproduced in the rest of the scanning on the locus ③. As shown in FIG. 14D, the signal of the track TA3 is initially reproduced in the scanning on the locus ④, and a little part of the signal of the track TA2 is reproduced in an end part of the scanning on the locus ④.

It is assumed that data composing one track is divided into 24 blocks at this time. Block numbers of the data of track TA2 detected in the scanning on the locus ① are assigned as the block numbers 1 to 5 as shown in FIG. 14E. Block numbers of the data of track TA2 detected in the scanning on the locus ② are assigned as the block numbers 4 to 13 as shown in FIG. 14F. Block numbers of the data of track TA2 detected in the scanning on the locus ③ are assigned as the block numbers 12 to 19 as shown in FIG. 14G. Block numbers of data of the track TA2 detected in the scanning on the locus ④ are assigned as the block numbers 21 to 24 as shown in FIG. 14H.

In this case, it is assumed that data of block number 7 is blanked due to a reproduction error in the scanning on the locus ②, and data of block number 20 is not reproduced in the scanning on any locus.

Data of each of the blocks is stored in the storage area of track TA2 of the data memory 14 connected to the data processing circuit 13 as follows. As shown in FIG. 14I, data of the block numbers 1 to 5 is initially stored in the storage area as data reproduced in the scanning on the locus ①. Thereafter, as the magnetic tape is scanned further, data of the block number of the block which can be reproduced is written therein, and data of the each of block numbers is successively stored in an order as shown in FIGS. 14J to 14L. When the scanning on the loci ① to ④ is finished, data of the block numbers 7 and 20 blank.

In this embodiment, the magnetic head A2 scans the magnetic tape T again on loci ①', ②', ③', ④' substantially similar to the loci ① to ④. In the scanning on the loci ①', ②', ③', ④', the data of block numbers 7 and 20 are reproduced and then data of all the blocks forming the track A2 is finally obtained.

Data of the track TB1, TB2, . . . can similarly be reproduced by using the magnetic heads B1, B2. Thus, the recorded data is reproduced with a density which is four times as high as that of the recording density.

While in this embodiment the magnetic heads A2, B2 are positionally displaced from the magnetic heads A1, B1 by a six-track amount in the height direction of the rotary head drum so as to scan the magnetic tape on the loci substantially similar to the loci on which the magnetic heads A1, B1 scan the magnetic tape to reproduce the data, the present invention is not limited thereto. The magnetic heads A2, B2 may be disposed at the same level as the magnetic heads A1, B1 in the height direction of the rotary head drum. It is unnecessary to displace the magnetic heads A2, B2 from the magnetic heads A1, B1 by an amount of tracks of an integral multiple in the height direction of the rotary head drum. Specifically, it is sufficient to reproduce data in the non-tracking system by using all four of the magnetic heads, the magnetic heads A1, A2, B1, B2.

Since the data is reproduced at a density which is four times as high as that of the recording density, there is increased the possibility that the data recorded on the magnetic tape can be reproduced completely. Accordingly, the data streamer according to this embodiment becomes highly reliable. In this case, since in this embodiment the rotary head drum 11 is rotated at the same constant speed when data is both recorded and reproduced, it is possible to control the rotation of the rotary head drum under the same condition when data is both recorded and reproduced. Therefore, it is possible to simplify an arrangement of a control system for controlling the rotary head drum 11. Since the non-tracking system allowing a higher recording density with which data is recorded on the magnetic tape is employed in this embodiment, it is possible to realize with a simple arrangement a data streamer which can both record data with high recording density and reproduce data with high density.

While the present invention is applied to a data streamer for recording and reproducing data used for a computer in the above embodiment, the present invention is not limited thereto and can be applied to a recording and reproducing apparatus for recording and reproducing other kinds of data, such as an audio signal or the like.

According to the present invention, since data is reproduced at a density which is four times higher than the recording density, it is possible to completely reproduce the recorded data with a sufficiently high scanning density. According to the present invention, since the rotary head drum 11 is rotated at the same constant speed when data is recorded and reproduced, it is possible to control the rotation of the rotary head drum 11 under the same condition when data is recorded and reproduced. Therefore, it is possible to simplify an arrangement of a control system for controlling the rotary head drum.

According to the present invention, since the magnetic heads A2, B2 other than the recording magnetic heads A1, B1 reproduce recorded data at the same time as when the magnetic heads A1, B1 record the data, and the error detection is carried out by using the error correction code included in the reproduced signal, it is possible to easily discriminate whether data is accurately recorded or not only by error detection, without resorting to the process of checking the recorded data and the reproduced data with each other.

Since the recorded signal whose recorded condition is determined as unsatisfactory in this case is recorded again on the magnetic tape T after a predetermined interval, it is possible to prevent a part of the recorded signal from being lacked.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the novel concepts of the present invention as defined in the appended claims.

What is claimed is:

1. A recording and reproducing apparatus for recording and reproducing a computer data signal on and from tracks each slanted relative to a longitudinal direction of a magnetic tape, said apparatus comprising:

a rotary head drum around which said magnetic tape is wrapped so as to be slanted at a predetermined angle;

first and second magnetic heads provided on said rotary head drum at positions apart from each other by a 180 degree rotational angle and each having a first azimuth angle;

third and fourth magnetic heads provided on said rotary head drum at positions apart from each other by a 180 degree rotational angle and each having a second azimuth angle different from said first azimuth angle;

data processing means for adding address data to each recording unit of a data signal and outputting a combined address data and data signal as a recording signal;

data signal decoding means for decoding said data signal from recorded signals a portion of which is reproduced by said first, second, third, and fourth magnetic heads based on said address data included in said recording signal; and control means which upon recording supplies said recording signal to said first magnetic head and said third magnetic head during first and second complete rotations of said rotary head drum, respectively, to record said recording signal on said magnetic tape and which upon reproduction during each of said first and second complete rotations supplies said recorded signal reproduced by said first, second, third, and fourth magnetic heads to said data signal decoding means so that when said recorded signals are reproduced by said first, second, third, and fourth magnetic heads said recorded signals are reproduced with a reproduction density that is four times higher than a recorded density.

2. A recording and reproducing apparatus according to claim 1, wherein said data processing means adds an error correction code to each of said recording units of said data signal to output said data signal as said recording signal.

3. A recording and reproducing apparatus according to claim 2 further comprising error detecting means for detecting an error of said recording signals by using said error correction code, wherein, upon recording, said control means controls said second and fourth magnetic heads to reproduce recording signals recorded on said magnetic tape by said first and third magnetic heads and discriminates a recorded state of said recording signal on said magnetic tape by supplying said reproduced recording signal to said error detecting means.

4. A recording and reproducing apparatus according to claim 3, wherein said data signal is supplied from an external equipment, and said apparatus further comprises: storage means for storing address data of a recording signal determined by said error detecting means as one having no error; and error reporting means for supplying an address of a data signal whose address data is not stored in said storage means as an address of a data signal having an error to said external equipment upon the end of recording.

5. A recording and reproducing apparatus according to claim 1, wherein said recording unit is set smaller than one track, where the track is a portion of the magnetic tape with a predetermined width and upon which the recording unit is recorded.

6. A recording and reproducing apparatus according to claim 1, wherein a transfer speed of said magnetic tape and a rotation speed of said rotary head drum upon recording are set equal to the transfer speed and the rotation speed upon reproduction.

7. A recording and reproducing apparatus according to claim 1, wherein reproduction of a non-tracking system is carried out upon reproduction.

8. The recording and reproducing apparatus according to claim 1, wherein said first and third heads are disposed from said second and fourth heads by a plurality of track widths along an axial direction of said rotary head drum.

9. A recording and reproducing apparatus for recording and reproducing a computer data signal on and from a magnetic tape, said apparatus comprising:

a rotary head drum around which said magnetic tape is wrapped so as to be slanted at a predetermined angle;

first and second magnetic heads provided on said rotary head drum at positions apart from each other by a 180 degree rotational angle and each having a first azimuth angle;

third and fourth magnetic heads provided on said rotary head drum at positions apart from each other by a 180 degree rotational angle and each having a second azimuth angle different from said first azimuth angle;

data processing means for adding address data and an error correction code to each recording unit of a data signal and outputting said data signal as a recording signal;

data signal decoding means for decoding said data signal from recorded signals reproduced by said first, second, third, and fourth magnetic heads based on said address data included in said recording signal;

error detection means for detecting an error of said recording signal by using said error correction code; and control means which upon recording supplies said recording signal to said first magnetic head and said third magnetic head during first and second complete rotations of said rotary head drum, respectively, to record said recording signal on said magnetic tape and controls said second and fourth magnetic heads to reproduce immediately during each of said first and second rotations said recording signal recorded by said first and third magnetic heads and discriminates a recorded state of said recording signal on said magnetic tape by supplying said reproduced recording signal to said error detecting means and which upon reproduction during each of said first and second complete rotations supplies said recorded signal reproduced by said first, second, third, and fourth magnetic heads to said data signal decoding means so that when said recorded signals are reproduced by said first, second, third, and fourth magnetic heads said recorded signals are reproduced with a reproduction density that is four times higher than a recorded density.

10. A recording and reproducing apparatus according to claim 9, wherein said data signal is supplied from an external equipment, and said apparatus further comprising storage means for storing address data of a recorded signal determined by said error detection means as one having no error, and error reporting means for supplying an address of a data signal whose address data is not stored in said storage means as an address of a data signal having an error to said external equipment upon the end of recording.

11. The recording and reproducing apparatus according to claim 9, wherein said first and third heads are disposed from said second and fourth heads by a plurality of track widths along an axial direction of said rotary head drum.

* * * * *